United States Patent [19]

Usami et al.

[11] Patent Number: 4,865,939

[45] Date of Patent: Sep. 12, 1989

[54] PROCESS FOR PREPARATION OF HEAT-SENSITIVE DIAZO MICROCAPSULE RECORDING MATERIAL USING PRESSURE APPLYING APPARATUS

[75] Inventors: Toshimasa Usami; Toshiharu Tanaka; Takayuki Hayashi, all of Shizuoka, Japan

[73] Assignee: Fuji Photo Film Co., Ltd., Kanagawa, Japan

[21] Appl. No.: 220,336

[22] Filed: Jul. 13, 1988

Related U.S. Application Data

[63] Continuation of Ser. No. 855,570, Apr. 25, 1986, abandoned.

[30] Foreign Application Priority Data

Apr. 25, 1985 [JP] Japan .......... 60-89494

[51] Int. Cl.[4] .......... B41M 5/18; G03C 1/52; B32B 3/26

[52] U.S. Cl. .......... 430/138; 430/151; 430/168; 430/327; 430/494; 503/200; 503/214; 503/226

[58] Field of Search .......... 430/138, 151, 168, 327, 430/494; 503/200, 214, 22 C

[56] References Cited

U.S. PATENT DOCUMENTS

| | | | |
|---|---|---|---|
| 2,595,916 | 5/1982 | Bartels | 430/168 |
| 2,691,587 | 10/1954 | Greig | 430/151 |
| 3,203,797 | 8/1965 | Muller | 430/151 |
| 4,032,690 | 6/1977 | Kohmura et al. | 503/214 |
| 4,411,979 | 10/1983 | Nagamoto et al. | 430/176 |
| 4,454,521 | 6/1984 | Suguro et al. | 503/214 |
| 4,497,887 | 2/1985 | Watanabe et al. | 430/151 |
| 4,598,035 | 7/1986 | Usami et al. | 430/151 |
| 4,654,256 | 3/1987 | Doree et al. | 428/30.44 |

FOREIGN PATENT DOCUMENTS

| | | | |
|---|---|---|---|
| 57-208296 | 12/1982 | Japan | 503/200 |
| 59-11287 | 1/1984 | Japan | 503/200 |
| 2111700 | 7/1983 | United Kingdom | 503/200 |

*Primary Examiner*—Charles L. Bowers, Jr.
*Attorney, Agent, or Firm*—Sughrue, Mion, Zinn, Macpeak & Seas

[57] ABSTRACT

A process for the production of a heat-sensitive recording material in which a color former causing a color formation reaction and a developer forming color on reaction with the color former are incorporated in a heat-sensitive recording layer, and at least one of the color former and the developer is contained in microcapsules having walls which are impermeable to both the color former and the developer at ordinary temperature but which becomes permeable to at least one of the color former and the developer on heating, where the heat-sensitive recording layer is coated on a support which is then subjected to surface treatment by passing it through a pressure applying apparatus comprising a metallic roll and an elastic roll in such a manner that the heat-sensitive recording layer is in contact with the metallic roll.

4 Claims, No Drawings

PROCESS FOR PREPARATION OF HEAT-SENSITIVE DIAZO MICROCAPSULE RECORDING MATERIAL USING PRESSURE APPLYING APPARATUS

This is a continuation of application Ser. No. 855,570 filed 4/25/86, abandoned.

FIELD OF THE INVENTION

The present invention relates to a heat-sensitive recording material, more particularly, to a heat-sensitive recording material which is excellent in storage stability after thermal recording. More specifically the present invention relates to a heat-sensitive recording material which provides high color density upon thermal recording.

BACKGROUND OF THE INVENTION

In recent years, heat-sensitive recording methods have grown in popularity in the facsimile and printer fields. As heat-sensitive recording materials for use in such recording methods, leuco color type heat-sensitive recording materials of excellent color density of and rate of color formation have been mainly used. However, conventional leuco color type heat-sensitive recording materials have the disadvantage in they readily form color upon handling after recording, heating or contact with solvents, thereby yielding a smudged recorded image. Further, they have the disadvantage that the color formed disappears due to the action of plasticizers in adhesive tapes (e.g., Cellotape).

In order to prevent color formation due to careless handling, Japanese Patent Publication No. 14531/75 discloses adding granulated wax and Japanese Utility Model Application Laid-Open No. 125354/81 discloses providing a covering layer to prevent plasticizer permeation. These methods, however, are not satisfactory, and cannot be used particularly for purposes in which alteration after recording must be prevented.

In order to prevent color formation in undesired areas after thermal recording, Japanese Patent Application (OPI) No. 91438/84 (the term "OPI" as used herein indicates a "published unexamined Japanese patent application") discloses a light-sensitive, heat-sensitive recording material in which microcapsules containing a photopolymerizable vinyl compound, a photo-polymerization initiator and one component causing a color formation reaction are used with another component capable of forming a color formation reaction with the above component which is exterior the microcapsules, all being provided on the same side of the support. Upon heating this recording material, the color forming component contained in the inside (core) of the microcapsules permeates through the microcapsule walls or the other component causing the color formation reaction exterior the microcapsules permeates through the microcapsule walls and enters the microcapsules. As a result, in both cases, color formation occurs. Accordingly, heating permits color formation in heated areas. By then applying overall light-exposure to polymerize the vinyl compound contained in the core of the microcapsules, permeation of the color forming component is prevented and thus color formation in uncolored areas can be prevented (this is sometimes called "fixation").

Japanese Patent Application (OPI) Nos. 123086/82 and 125092/82 (corresponding to U.S. Pat. No. 4,411,979), for example, disclose another method. In accordance with this method, a light-sensitive, heat-sensitive recording material containing a diazo compound, a coupling component and an alkali generating agent or a color forming aid is used; this material is overall irradiated with light after thermal recording to thereby decompose unreacted diazo compound, whereby color formation can be stopped. This recording material, however, has the disadvantage in that pre-coupling gradually proceeds during storage of the material, causing undesirable color formation (fog). In order to eliminate this problem, Japanese Patent Application (OPI) No. 190886/84 discloses a material in which at least one of the diazo compound, the coupling component and the color forming aid is incorporated in the inside (core) of the microcapsule.

With the above light-sensitive, heat-sensitive recording materials utilizing microcapsules, recording apparatus, including a light fixing unit, can be simplified, and the storage stability before recording (life storage stability) is excellent.

In the case of a system not including the capability for the above-described fixation, though based on microcapsules, i.e., a heat-sensitive recording material which contains a basic dye precursor in microcapsules and a developer causing a color formation reaction with the precursor present exterior the microcapsules, image storage stability (other than heat resistance) is excellent because the color forming dye after thermal recording is present in the interior of the microcapsules.

In the case of a heat-sensitive recording material based on microcapsules which has excellent recorded images storage stability, the color forming component isolated by the microcapsule walls permeates on heating, thereby reacting. Thus a reduction in heat color-forming properties is easily caused.

SUMMARY OF THE INVENTION

An object of the present invention is to provide a heat-sensitive recording material which provides high color density upon thermal recording and which has excellent storage stability after thermal recording.

Another object of the present invention is to provide a heat-sensitive recording material which is easily produced.

The present invention relates to a process for producing a heat-sensitive recording material in which a color former causing a color formation reaction and a developer forming color on reacting with the color former are incorporated in a heat-sensitive recording layer, and at least one of the color former and the developer is incorporated in microcapsules having walls which are impermeable to both the color former and the developer at ordinary temperature (e.g., 0° to 40° C.) but which becomes permeable to at least one of the color former and the developer on heating (e.g., 70° C. or more), typically to cause the color formation reaction, which process comprises providing the heat-sensitive recording layer on a support and surface treating the same by passing the support with the heat-sensitive recording layer provided thereon through a pressure-applying apparatus comprising a metallic roll and an elastic roll in such a manner that the heat-sensitive recording layer comes into contact with the metallic roll. It is preferred that the color former is incorporated in microcapsules.

DETAILED DESCRIPTION OF THE INVENTION

The microcapsules of the present invention are different from microcapsules used in conventional recording material where a reactive substance in the inside (core) of the microcapsules is brought into contact with a reactive substance exterior the microcapsules by breaking the microcapsules through the application of heat or pressure, to thereby cause a color formation reaction. That is, in the microcapsules of the present invention, the reactive substances inside and outside the microcapsules are caused to pass through the microcapsule walls by application of heat.

In order that the reactive components inside and outside the microcapsules come into contact with each other with high efficiency upon the application of heat, it is important that the total contact area be increased and the area of permeation (i.e., the area of the individual microcapsules) therethrough by diffusion be increased by decreasing the particle size of microcapsule.

Prior to the step at which the reactive components react on contact with each other after permeation through the capsule walls, a step occurs where heat is transferred from, e.g., a thermal head, to the recording paper. Increasing the efficiency of heat transfer is advantageous for increasing the sensitivity of the recording paper and in order to increase the heat transfer efficiency, it is desirable to increase the smoothness of the surface of the recording paper, more specifically to apply a calendering treatment thereto. The initial Beck smoothness of the recording paper prior to the calendering treatment is preferably 50 to 300 seconds, and the final Beck smoothness of the recording paper subjected to the calendering treatment is preferably 300 to 700 seconds.

Imparting smoothness by such a surface treatment, however, is associated with the problem of fog formation. Particularly, in the case that microcapsules are used, the microcapsules are readily broken by pressure and the color formation reaction occurs. However, it has been surprisingly discovered that if the particle size of the microcapsules is decreased and the thickness of the capsule walls is increased to greater than a certain value, it is possible to apply a conventional calender treatment thereto without breakage.

Decreasing the particle size of microcapsules is effective for both increasing the contact efficiency of the reaction components and increasing the heat transfer efficiency due to an increase in surface smoothness through the application of a calendering treatment without causing the formation of fog.

It is preferred that the volume average particle diameter of the microcapsules is not more than 2 $\mu$ and the ratio of the number average wall thickness to volume average particle diameter (number average wall thickness/volume average particle diameter) is $10^{-2}$ to 0.5, more preferably 0.04 to 0.4.

The volume average particle diameter of the microcapsules in the present invention is typically determined using a Microtrack particle size measuring apparatus (Model 7991-3 produced by Leeds & Northrup Co). The volume average particle diameter is determined by the following relationships:

$$\frac{w_1x_1 + w_2x_2 + \ldots + w_nx_n}{w_1 + w_2 + \ldots + w_n}$$

wherein $w_n$ represents a volume of individual microcapsules and $x_n$ represents a particle diameter of individual microcapsules.

The number average wall thickness is typically determined by the following method.

A microcapsule solution is coated on a polyethylene terephthalate film base which has been subjected to surface with 1% aqueous styrene-butadiene rubber dispersion treatment, is coated with an epoxy resin, and then the epoxy resin solidified by allowing the same to stand at a temperature of 60° C. for one day and one night. One can then cut a single microcapsule into just two parts with a super microtome (Model MT-I produced by Dupont Co.) to thereby produce a super thin strip. A photograph is taken of the strip using a film (Fuji Electron Microscope FG Film produced by Fuji Photo Film Co., Ltd.) under the following conditions: acceleration voltage of 100 KV and a magnification of about 10,000 to 50,000× using a permeation type electron microscope (Model HU-12A produced by Hitachi Co., Ltd.). Based on this electron micrograph, the wall thickness is measured, and the number average wall thickness $\delta$ (microns) is calculated.

As a secondary means to prevent the formation of fog due to calendering, the addition of granular wax such as paraffin wax, etc. is effective. The amount of granular wax added is preferably 3 to 40% by weight per total solids content. Therefore, if desired, this addition of granular wax can be employed in the present invention.

The calendering is performed by coating a paper support with a heat-sensitive recording layer and so forth, and then passing the resulting member through a pressure applying apparatus comprising a metallic roll and an elastic roll in such a manner that the heat-sensitive recording surface comes into contact with the metallic roll. During calendering, heating the metallic roll to an extent which does not cause the formation of color fog (i.e., in such a manner that a color forming reaction does not occur), preferably 30° to 100° C., more preferably 50° to 70° C., is advantageous to increase smoothness. The preferred metallic roll is a steel roll plated with chromium, etc., and the preferred elastic roll is a rubber roll, a cotton roll, a paper roll, etc. The surface treatment is preferably carried out under a pressure of about 10 to 500 kg/cm, preferably 50 to 200 kg/cm, at a linear speed of about 5 to 1,000 m/min., preferably 100 m/min. to 1,000 m/min.

The recording material of the present invention can be classified into the following two groups depending on the type of the reactive components.

(1) A heat-sensitive recording material in which microcapsules containing a basic dye precursor as a core substance and a developer which reacts with the basic dye precursor to form color are provided on the same side of the support, as described, for example, in U.S. Pat. No. 4,529,681.

(2) A heat-sensitive recording material in which microcapsules containing a diazo compound as a core substance and a coupling agent capable of causing a coupling reaction with the diazo compound to yield color are provided on the same side of the support, as described, for example, in U.S. patent application Ser. No. 600,267 filed on Apr. 13, 1984.

The developer (including a coupling agent) used in the present invention is preferably 0.1 to 10 mol, more preferably 1 to 5 mol, based on 1 mol of the color former (including a diazo compound).

Heat-sensitive recording materials of type (1) utilizing microcapsules of the present invention can be prepared by, for example, the method described in Japanese Patent Application No. 212248/84. That is, a basic dye precursor such as Crystal Violet Lactone is dissolved or dispersed in a suitable organic solvent and/or a vinyl compound and then encapsulated. The developer is a fine solid dispersion (preferably 0.2 to 3 μ, more preferably 0.5 to 2 μ) of an electron accepting compound such as 2,2-bis(4-hydroxyphenyl)propane, as described, for example, in Japanese Patent Application No. 99490/84 and Japanese Patent Application (OPI) No. 91438/84.

In the preparation of the microcapsule walls of the present invention, it is effective to employ a microcapsulation method utilizing polymerization of a reaction from the inside of oil droplets. That is, there can be obtained in a short period of time microcapsules having a uniform particle size, which are suitable for a recording material having excellent life storage stability.

This technique and representative examples of useful compound are described in U.S. Pat. Nos. 3,726,804 and 3,796,669.

Preferred capsule wall-forming substances are polyurethanes, polyureas, polyamides, polyesters, and polycarbonates. More preferred are polyurethanes and polyureas.

In order to produce fine capsules having a particle size of not more than 2 μ, it is important to apply a strong shear force during emulsification of the core substance of the microcapsules. After formation of fine oil droplets, walls of a polymeric substance are formed around the oil droplets.

A strong shear force can be produced by an emulsifying machine. This machine is not critical and, for example, a dissolver type machine and a supersonic dispersion type machine can be effectively used.

Heat-sensitive recording materials of type (2) can be prepared by, e.g., the method described in Japanese Patent Application (OPI) Nos. 190886/84 and 6493/85.

That is, the diazo compound is dissolved or dispersed in a suitable solvent and then emulsified into fine particles having a diameter of not more than 2 μ in the same manner as in the heat-sensitive recording material (1) to thereby prepare microcapsules. In addition to the microcapsules, the coupling component is present as an essential component in the form of solid fine particles having a size of not more than several microns, preferably 0.5 to 2 μ. If desired, other conventional auxiliary agents can be added.

In the heat-sensitive recording materials of types (1) and (2), the volume average particle diameter of fine solid dispersed particles exterior the microcapsules is desirably 0.2 to 4 and most especially not more than 2 μ. The reason for this is that it is required for the solid dispersion particles to be fine particles so that they can come into close contact with the capsules having a diameter of 2 μm or less.

The present invention is now described in greater detail with reference to the following examples. In addition, all parts, percents and ratios in these examples, unless otherwise indicated, are by weight.

EXAMPLE 1, AND COMPARATIVE EXAMPLE 1

300 g of Crystal Violet Lactone and 1,800 g of a xylylene diisocyanate/trimethylolpropane (3:1) adduct were dissolved in a mixed solvent of 2,400 g of diisopropylnaphthalene and 500 g of ethyl acetate. The resulting solution was mixed with an aqueous solution of 350 g of polyvinyl alcohol, 170 g of gelatin and 240 g of 1,4-di(hydroxyethoxy)benzene in 5,800 g of water, and then emulsified with a Kedy mill at 20° C. to prepare an emulsion. To this emulsion was added 10 kg of water and the resulting mixture was heated to 60° C. while stirring. After 2 hours at 60° C. a microcapsule solution containing the Crystal Violet Lactone as the core substance was obtained. The average particle diameter of the capsules was 1.8 μ, the thickness of the capsule walls was 81 mμ, and the number average wall thickness/volume average particle diameter ratio was 0.05/1.

2,000 g of p-benzyloxyphenol and 2,000 g of bisphenol A were added to 10 kg of a 5% aqueous polyvinyl alcohol solution and dispersed therein by the use of a sand mill for about 24 hours to prepare bisphenol A dispersion having an average particle size of 1.6μ.

The above-prepared capsule solution and bisphenol A dispersion were mixed in a ratio of 5:3.

To 20 kg of the mixture thus prepared 1 kg of precipitated calcium carbonate was added and thoroughly dispersed therein to prepare a coating solution.

This coating solution was coated with an air knife on a base paper having a basis weight of 50 $g/m^2$ and a Beck smoothness of 25 seconds in such a manner that the amount of the coating solution coated was 8 $g/m^2$ (calculated as solids), and then dried. This base paper was subjected to a surface treatment by passing it through a pressure applying apparatus comprising a hard chromium-plated roll and a hard rubber roll (Shore hardness: 80) and maintained at 60° C. (a pressure: 100 kg/cm; a travel rate: 200 m/min.).

For comparison, a coated paper not subjected to such surface treatment was prepared.

The thus prepared heat-sensitive papers were each recorded at a pulse width of 1.0 m.sec. and an energy of 0.7 w/dot using a printing tester produced by Kyocera Co., Ltd. print density: 8 dot/mn main scanning); 5.6 line/mm (sub-scanning). The blue density in printed areas and in the background area was measured with a Macbeth densitometer.

The evaluation results are shown in Table 1.

EXAMPLE 2

Capsules were prepared using a diazo compound having the following formula:

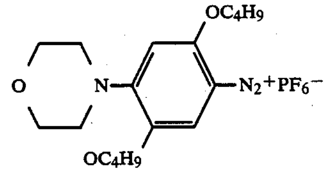

20 g of the above diazo compound, 60 g of a tolylene diisocyanate/trimethylolpropane (3:1) adduct, and 180 g of a xylylene diisocyanate/trimethylolpropane (3:1) adduct were dissolved in a mixed solvent of 240 of dibutyl phthalate and 50 g of ethyl acetate. The resulting diazo compound solution was mixed with an aqueous solution of 35 g of polyvinyl alcohol and 17 g of gelatin in 580 g of water, and then emulsified at 20° C. using a homogenizer (produced by Nippon Seiki Co., Ltd.). To the emulsion thus prepared 1,000 g of water was added. The resulting mixture was heated to 60° C. while stirring. After 2 hours at 60° C., a capsule solution (average particle diameter of capsules: 1.2 μ) containing the diazo compound as the core substance was obtained. The average capsule wall thickness was 83 mμ. The number average wall thickness/volume average particle diameter was 0.069/1.

200 g of 2-hydroxy-3-naphthoenic acid anilide was added to 1,000 g of a 5% aqueous solution of polyvinyl alcohol and dispersed therein by the use of a sand mill over about 24 hours to prepare a dispersion of the coupling component (average particle diameter: 1.5 μ).

200 g of triphenylguanidine was dispersed in 1,000 g of a 5% aqueous solution of polyvinyl alcohol using a sand mill over about 24 hours to obtain a dispersion of the triphenylguanidine (average particle diameter: 1.5 μ). 200 g of p-benzyloxyphenol was added to 1,000 g of a 5% aqueous solution of polyvinyl alcohol and dispersed therein by the use of a sand mill over about 24 hours to prepare a dispersion of the p-benzyloxyphenol (average particle diameter: 1.5 μ).

500 g of the capsule solution, 150 g of the coupling component dispersion, 150 g of the triphenylguanidine dispersion, and 15 parts of the p-benzyloxyphenol dispersion were mixed to prepare a coating solution.

This coating solution was coated on a high quality paper (50 g/m$^2$) by the use of a coating rod in such a manner that the amount of the coating solution was 10 g/m$^2$ (dry basis) and then dried. This paper was subjected calendering by passing the same through the same pressure-applying apparatus as in Example 1 where the surface temperature of the rolls was maintained at 50° C., and then evaluated in the same manner as in Example 1.

For comparison, a coated paper not subjected to the surface treatment was prepared.

The evaluation results are set forth in Table 1.

TABLE 1

| Run No. | calender | Density of Recorded Image | Fog of Background |
|---|---|---|---|
| Example 1 | yes | 1.19 | 0.07 |
| Comparative Example 1 | no | 1.05 | 0.07 |
| Example 2 | yes | 1.21 | 0.08 |
| Comparative Example 2 | no | 1.06 | 0.08 |

As can be seen from the results in Table 1, in Examples 1 and 2 where the pressure applying treatment (calendering treatment) was applied, the density of the recorded images was higher than in Comparative Examples 1 and 2 where the pressure applying treatment was not applied. This calendering treatment did not cause an increase in fog.

While the invention has been described in detail and with reference to specific embodiments thereof, it will be apparent to one skilled in the art that various changes and modifications can be made therein without departing from the spirit and scope thereof.

What is claimed is:

1. A process for producing a heat-sensitive recording material in which a color former causing a color formation reaction and a developer forming color on reaction with the color former are incorporated in a heat-sensitive recording layer, and at least one of the color former and the developer is incorporated in microcapsules having microcapsule walls which are impermeable to both the color former and the developer at ordinary temperatures but which becomes permeable to at least one of the color former and the developer on heating, which process comprises providing the heat-sensitive recording layer on a support and then subjecting the support with the heat-sensitive recording layer to a surface treatment by passing it through a pressure applying apparatus comprising a metallic roll and an elastic roll in such a manner that the heat-sensitive recording layer comes into contact with the metallic roll such that a color forming reaction does not occur, wherein the surface treatment comprises heating the metallic roll and passing the heat-sensitive recording layer on a support through the pressure applying apparatus to a pressure of about 10 to 500 kg/cm. at a linear speed of about 5 to 1,000 m/min., and wherein: (1) the microcapsules contain a basic dye precursor as a core substance and the developer which reacts with the basic dye precursor to form color and are provided on the same side of the support, or (2) the microcapsules contain a diazo compound as a core substance and a coupling agent capable of causing a coupling reaction with the diazo compound to yield color and are provided on the same side of the support, and the microcapsules incorporating the color former have a volume average particle diameter of not more than 2μ and a ratio of the number average wall thickness to volume average particle diameter of from $10^{-2}$ to 0.5.

2. A process for producing a heat-sensitive material as claimed in claim 1, wherein the surface treatment comprises heating the metallic roll to a temperature in the range of from 30° to 100° C.

3. A process for producing a heat-sensitive material as claimed in claim 1, wherein the ratio of the number average wall thickness to volume average particle diameter is from 0.04 to 0.4 and the metallic roll is heated to a temperature in the range of from 50° to 70° C.

4. A process for producing a heat-sensitive material as claimed in claim 3, wherein the surface treatment is carried out under a pressure of 50 to 200 kg/cm at a linear speed of 100 m/min to 1,000 m/min.

* * * * *